(12) United States Patent
Baumgartner et al.

(10) Patent No.: US 7,605,508 B2
(45) Date of Patent: Oct. 20, 2009

(54) ELECTRICAL MACHINE WITH SUPPORT OF THE ROTOR ON AN END FACE OF THE STATOR

(75) Inventors: Joachim Baumgartner, Volkach (DE); Tobias Buban, Gerbrunn (DE); Winfried Nöller, Dettelbach (DE); Marcus Podack, Würzburg (DE)

(73) Assignee: Brose Fahrzeugteile GmbH & Co. Kommanditgesellschaft, Wuerzburg (DE)

( * ) Notice: Subject to any disclaimer, the term of this patent is extended or adjusted under 35 U.S.C. 154(b) by 97 days.

(21) Appl. No.: 11/381,472

(22) Filed: May 3, 2006

(65) Prior Publication Data
US 2006/0279148 A1 Dec. 14, 2006

(30) Foreign Application Priority Data
May 11, 2005 (EP) ................... 05010260

(51) Int. Cl.
H02K 5/16 (2006.01)
H02K 1/00 (2006.01)
H02K 3/46 (2006.01)

(52) U.S. Cl. .............. 310/90; 310/89; 310/91; 310/43; 310/67 R

(58) Field of Classification Search .......... 310/43, 310/89, 90, 91, 154.09, 71, 216, 141, 142, 310/146, 149, 67 R, 90.5
See application file for complete search history.

(56) References Cited

U.S. PATENT DOCUMENTS

| | | | | |
|---|---|---|---|---|
| 3,701,911 A | * | 10/1972 | Hallerback | 310/60 R |
| 4,471,246 A | * | 9/1984 | Paillet | 310/42 |
| 5,414,316 A | * | 5/1995 | Michel et al. | 310/90 |
| 5,945,756 A | * | 8/1999 | Periyathamby et al. | 310/89 |
| 6,040,647 A | * | 3/2000 | Brown et al. | 310/89 |
| 6,204,579 B1 | * | 3/2001 | Arpino | 310/43 |
| 6,437,464 B1 | * | 8/2002 | Neal | 310/43 |
| 6,452,299 B2 | | 9/2002 | Drexlmaier | 310/91 |
| 6,718,617 B2 | | 4/2004 | Drexlmaier | 29/598 |
| 6,803,689 B2 | * | 10/2004 | Rupp et al. | 310/91 |
| 2001/0030478 A1 | | 10/2001 | Drexlmaier | 310/91 |
| 2002/0047395 A1 | * | 4/2002 | Hioki et al. | 310/90 |
| 2002/0112341 A1 | | 8/2002 | Drexlmaier | 29/598 |
| 2002/0113506 A1 | * | 8/2002 | Wong | 310/89 |
| 2003/0146668 A1 | * | 8/2003 | Sun et al. | 310/90.5 |
| 2003/0178903 A1 | * | 9/2003 | Rapp | 310/156.28 |
| 2004/0256936 A1 | * | 12/2004 | Takahashi et al. | 310/91 |
| 2005/0012415 A1 | * | 1/2005 | Hatano et al. | 310/80 |
| 2005/0116562 A1 | * | 6/2005 | Schlosser et al. | 310/89 |

FOREIGN PATENT DOCUMENTS

DE 1928596 U 9/1965

(Continued)

*Primary Examiner*—Quyen Leung
*Assistant Examiner*—John K Kim
(74) *Attorney, Agent, or Firm*—Baker Botts L.L.P.

(57) ABSTRACT

An electrical machine has a stator, a rotor, which features a rotor shaft, and at least one bearing for the rotor. The bearing is supported on a bearing block, which in its turn rests on an end face of the stator or on an insulating end disk positioned on an end face of the stator and/or is supported inside the stator.

7 Claims, 3 Drawing Sheets

FOREIGN PATENT DOCUMENTS

| | | |
|---|---|---|
| DE | 3534381 C2 | 11/1989 |
| DE | 19542021 A1 | 5/1997 |
| DE | 29612395 U1 | 1/1998 |
| DE | 19542021 C2 | 9/1999 |
| DE | 19839640 B4 | 12/2004 |
| GB | 912734 | 9/1961 |
| GB | 1297329 | 11/1972 |
| GB | 1306633 | 2/1973 |

\* cited by examiner

Section X-X

ELECTRICAL MACHINE WITH SUPPORT OF THE ROTOR ON AN END FACE OF THE STATOR

PRIORITY

This application claims priority from European Patent Application No. EP05010260.7, which was filed on May 11, 2005, and is incorporated herein by reference in its entirety.

TECHNICAL FIELD

The invention relates to an electrical machine which features a stator and a rotor. This type of electrical machine can be used in the motor vehicle sector and can be used there for example as a window winding motor or as a pump drive.

BACKGROUND

An arrangement for setting the axial play between the rotor and the stator of an electric motor is already known from DE 35 34 381 C2. With this known arrangement a bearing which is fixed under normal operating conditions is embodied for the rotor shaft as a cylinder bearing. To set the axial play the cylinder bearing can be shifted axially relative to its stator-side bearing end plate holder by a pressure greater than the axial load arising during normal operation.

A plastic bearing end plate for electrical machines is known from DE 195 42 021 C2. This bearing end plate is provided for covering a winding head of the stator winding of the electrical machine and features an annular cutout for accommodating the winding head. The rotor shaft of the machine described in this document is connected to the bearing end plate via a ball race.

A motor with a cup bearing able to be fixed in a bearing holder with axial play adjustment for a rotor shaft is known from DE 198 39 640 B4. This known motor is provided with a spring clip of greater spring stiffness adjacent to the area of the one axial end of the cup bearing, axially shifted corresponding to the relevant axial play in an end operating position and fixed in this position into a bearing holder of the motor. Furthermore the known motor features a second spring clip of lower spring stiffness located in the area of the other axial end of the cup bearing corresponding to an elastic pressure against the first spring clip of the cup bearing axially displaced in a final operating position and fixed in this position in the bearing holder.

SUMMARY

The object of the invention is to specify an electrical machine with improved positioning of the rotor.

This object can be achieved by an electrical machine comprising a stator, a rotor comprising a rotor shaft, and a bearing for the rotor, wherein the bearing is supported on a bearing block which in its turn is supported axially on an end face of the stator or on an insulating end disk positioned on an end face of the stator and/or is supported internally in the stator.

The bearing can be positioned in a step of the bearing block and can be supported there both in the axial and also in the radial direction. The outer side of the bearing block facing away from the bearing can be supported in the radial direction on the inner wall of the insulating end disk. The inner wall of the insulating end disk can be provided with latching hooks which effect an additional axial fixing of the bearing block. The bearing block may comprise retaining fingers which engage in a slot in the stator, respectively. The bearing block and the insulating end disk may form a one-piece plastic molded part. The bearing can be a ball race, the outer ring of the ball race can be supported in the bearing block and a spring washer may be provided in the axial direction between the ball race and the bearing block. The bearing can be a cup bearing and the cup may be pressed into the bearing block by means of a spring clip. The cup bearing can be injection-molded into the bearing block.

The advantages of the invention lie especially in the fact that the disadvantages of known electrical machines in which the rotor bearing is attached in a bearing end plate are overcome. These disadvantages above all stem from the fact that bearing end plates in general are bulky and require special geometrical forms and also tolerances. The tolerance chains of known end bearing end plates are mostly long since the support of the bearing end plate and thereby of the rotor is undertaken using the external diameter of the stator. In this case the overall smooth running of the electrical machine is always dependent on the punch quality of the stator. Furthermore with known electrical machines the magnetic influence of the bearing end plates made of metal must be taken into account as a result of their proximity to the magnetic field. These disadvantages of known electrical machines are essentially rectified in accordance with the present invention by the fact that the rotor bearing is supported in a journal which on one side rests axially on an end face of the stator or on an insulation end disk positioned on an end face of the stator. With this solution the rotor is supported axially not using an end bearing in the external area of the stator but on an end face of the stator or on an insulating end disk positioned on an end face of the stator. The rotor bearing is supported radially not in external area of the stator, but "seen in a radial direction" in the inner area of the same using the bearing block which is supported in radial direction in the stator slots or on the insulating end disk of the electrical machine in the radial direction.

The invention enables a compact electrical machine to be manufactured with reduced use of materials compared to known solutions. The overall smooth running of the electrical machine is no longer dependent on the quality of the punched stator package. The long tolerance chains existing for known machines are significantly reduced with a machine in accordance with the invention, so that a more exact fixing of the rotor of the machine can be achieved.

BRIEF DESCRIPTION OF THE DRAWINGS

Further advantageous features of the invention emerge from the explanation of the exemplary embodiments with reference to the Figures. The drawings show FIG. 1 a cross-sectional diagram of an electrical machine in accordance with a first exemplary embodiment for the invention, FIG. 2 a perspective diagram of a part of the A-side of the electrical machine shown in FIG. 1, FIG. 3 an enlarged cross-sectional diagram of a part of the B-side of the machine shown in FIG. 1 and FIG. 4 a perspective diagram of a part of the A-side of an electrical machine in accordance with a second exemplary embodiment for the invention.

DETAILED DESCRIPTION

Figure 1:
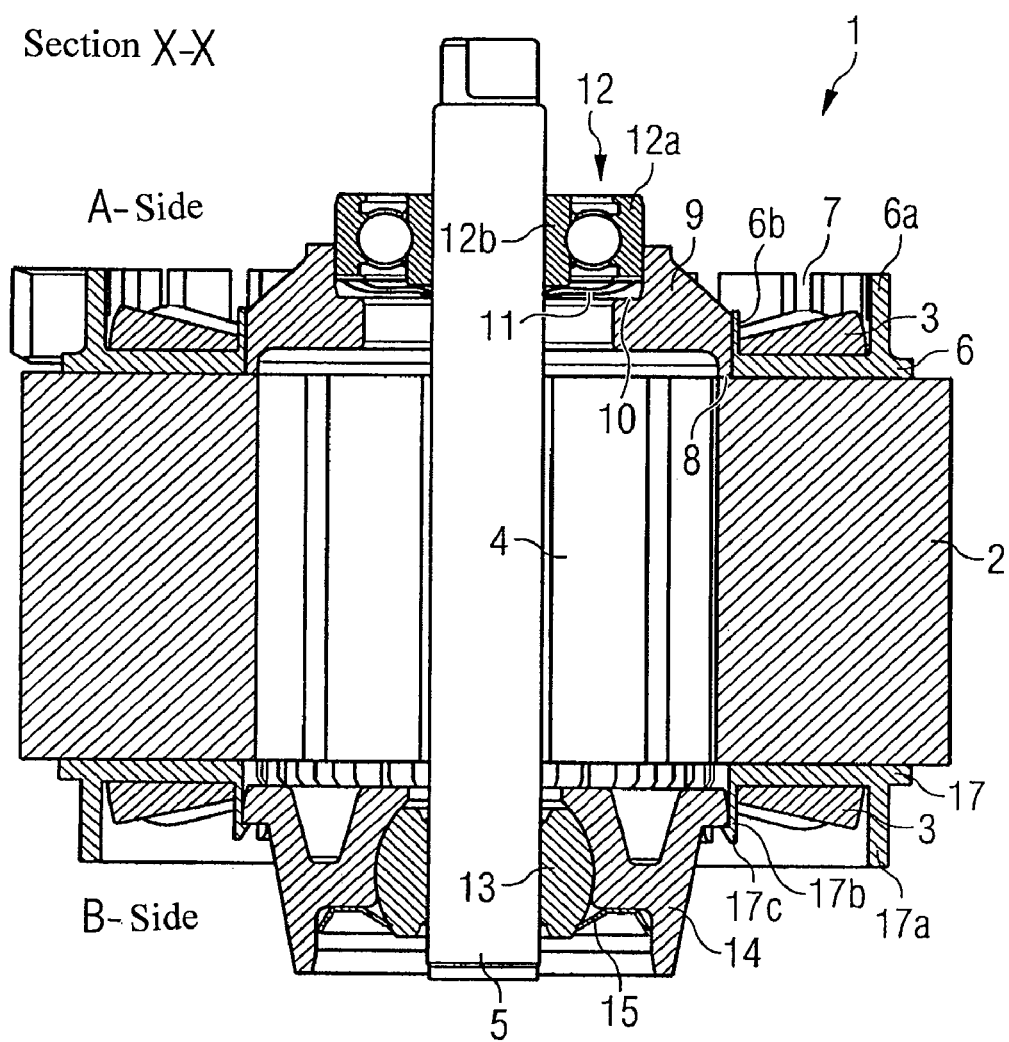

FIG. 1 shows a cross-sectional diagram of an electrical machine in accordance with a first exemplary embodiment for the invention.

The electric motor 1 shown features a stator containing a stator core 2 and a stator winding 3. Furthermore the electric motor shown is provided with a rotor to which a rotor shaft 5 and a rotor core 4 belong. The rotor shaft is supported in the A-side end area of the electric motor in a ball race 12 and in the B-side end area of the electric motor in a cup bearing which features a cup 13.

The ball race 12 has an outer ring 12a and an inner ring 12b. The inner ring 12b is permanently fixed to the rotor shaft 5. The outer ring 12a is supported both in the axial direction and also in the radial direction in a step 10 of a bearing block 9. To compensate for tolerances a spring washer 11 can be provided in the axial direction between the outer ring 12a of the ball race 12 and the step of the bearing block 9.

The bearing block 9 is supported in an axial direction against a support bar 8. This support bar 8 is a part of the end face of the stator or stator package or a continuation of an insulating end disk positioned on the A-side end face of the stator. The insulating end disk 6 has an outer wall 6a consisting of a plurality of tooth-shaped elevations running in a circle around the rotor shaft with intermediate spaces between the teeth 7. Furthermore the insulating end disk 6 has an inner wall 6b, which also consists of a plurality of tooth-shaped elevations running in a circle around the rotor shaft with intermediate spaces between the teeth. The bearing block 9 is supported in a radial direction on the inside of the inner wall 6b in the exemplary embodiment shown.

In the B-side end area the rotor shaft 5 of the electric motor 1 is supported in a cup bearing which features a cup 13. This is supported in its turn in a bearing block 14 and is pressed into this block by a spring clip 15. An insulating end disk 17, featuring an outer wall 17a and an inner wall 17b, is also provided on the outside end face of the stator in the exemplary embodiment shown The end area of the inner wall 17b of the insulating end disk 17 is—as is explained below with reference to FIG. 3—provided with latching hooks 17c which are used for additional axial fixing of the bearing block 14 and thereby of the cup 13. The cup can if necessary also be injection-molded into the bearing block.

Figure 2:
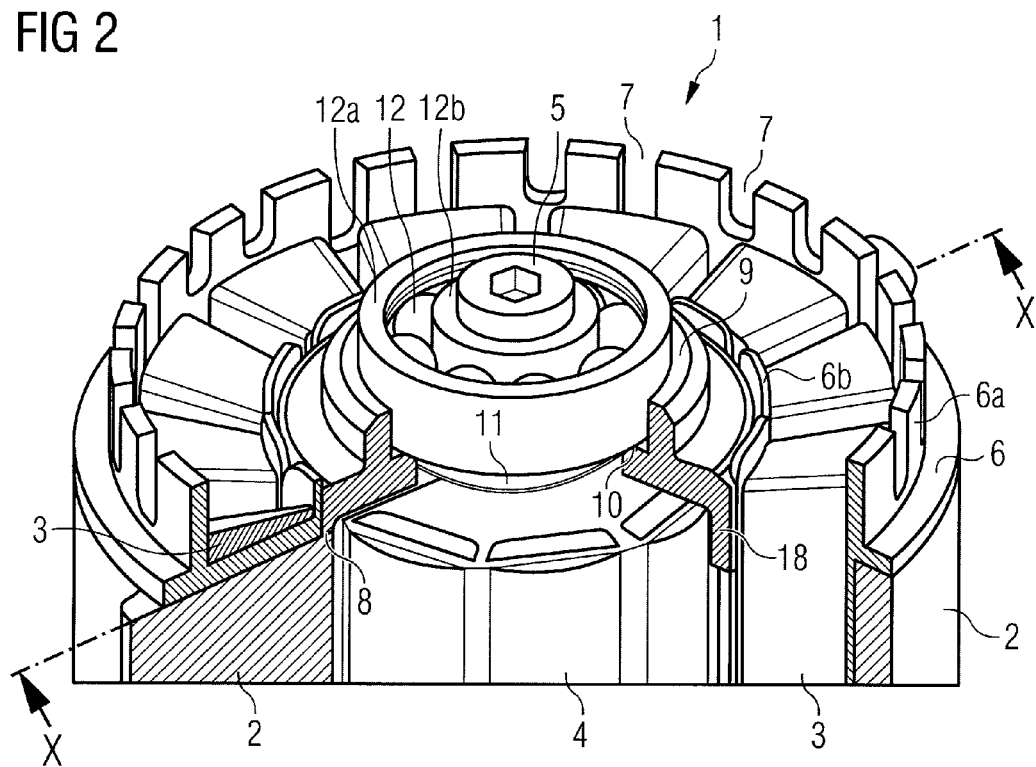

FIG. 2 shows are a perspective diagram of a part of the A-side of the electric motor shown in FIG. 1. The components of the motor 1 already mentioned above, namely the stator core 2, the stator winding 3, the rotor core 4, the rotor shaft 5, the insulating end disk 6, the spaces between the teeth 7, the axial support bar 8, the bearing block 9 for the ball race, the step 10 of the bearing block 9, the spring washer 11 as well as the ball race 12 with the outer ring 12a and the inner ring 12b, can be seen from this diagram.

FIG. 2 further reveals that the bearing block 9 is preferably provided with retaining fingers 18 which extend in each case into the associated stator slot. These retaining fingers are used to provide an additional radial support of the bearing block 9 in the stator slots. This further improves the centering of the rotor which, in its turn, is supported by the ball race 12 in the step 10 of the bearing block 9. Furthermore an anti-torsion facility is advantageously obtained by these retaining fingers 18, such that, during operation of the motor, the bearing block cannot rotate in an undesired manner relative to the stator.

The axial support of the bearing block 9 shown in FIGS. 1 and 2 can be further improved by elevations formed on the upper sides of the inner wall 6b of the insulating end disk 6 being provided with latching hooks not shown in the diagram which additionally fix the bearing block 9 and thereby the rotor coupled via the ball race 12 with the bearing block in the axial direction.

Figure 3:
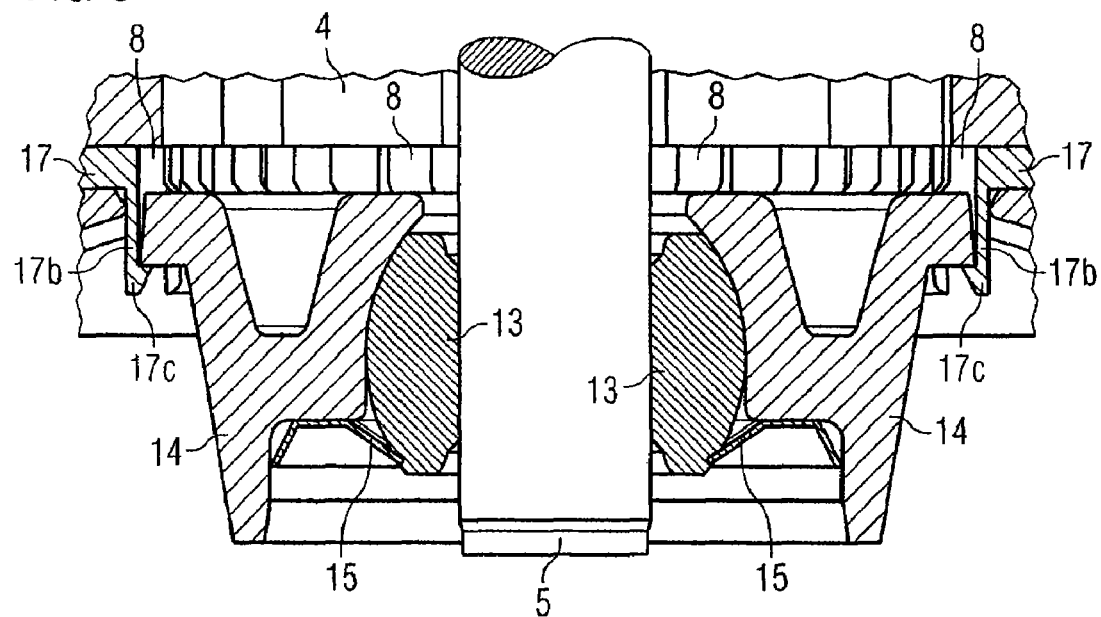

FIG. 3 shows an enlarged cross-sectional diagram of a part of the B-side of the electric motor shown in FIG. 1. It is especially evident from this enlarged diagram that the cup 13 of the cup bearing is pressed by a spring clip 15 into the bearing block 14. It further emerges from FIG. 3 that the bearing block 14 is supported in an axial direction on an axial support bar 8 which involves a continuation of the insulating end disk 17. Furthermore it can be seen from FIG. 3 that the inner wall 17b of the insulating end disk 17 is provided in its end area with latching hooks 17c which improves the axial support or fixing of the bearing block 14 and thereby also of the rotor shaft 5 coupled with the bearing block via the cup bearing.

As an alternative to an axial support of the bearing block 14 on a continuation 8 of the insulating end disk 17 the axial support of the bearing block 14 can also be undertaken on the end face of the stator or stator package itself, as has already been explained above in connection with the A-side ball race.

Figure 4:
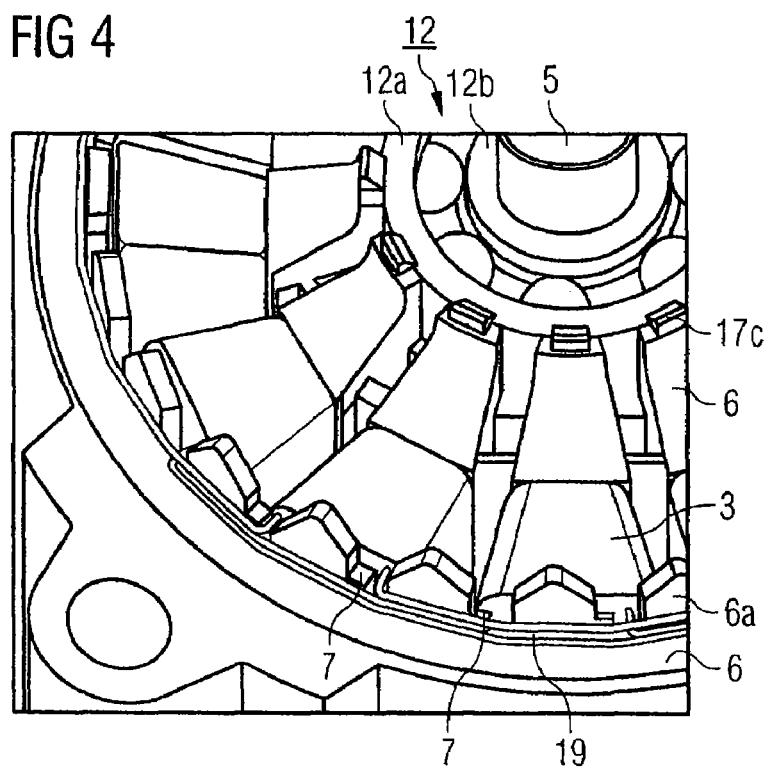

FIG. 4 shows a perspective diagram of a part of the A-side of an electrical machine in accordance with a second exemplary embodiment for the invention. This differs from the first exemplary embodiment shown in FIG. 1 essentially in that the bearing block and the insulating end disk form a one-piece plastic molded part which is used for axial and radial support of the outer ring 12a of the ball race and thereby of the rotor shaft 5. Instead of a plastic molded part, or a molded part made of another insulating material, can also be used.

Also to be seen in FIG. 4 are the tooth-shaped elevations forming the outer wall 6a of the insulating end disk and the spaces 7 provided between the teeth.

FIG. 4 further shows the winding wire 19 which is guided through the spaces between the teeth 7 to the associated stator tooth in each case and is used for winding around the tooth in the sense of forming the stator winding.

It further emerges from FIG. 4 that the inner end surface of the bearing block forming a one-piece plastic molded part 6 with the insulating end disk is provided on its upper side with latching hooks 17c, which effect additional axial support or fixing of the outer ring 12a of the ball race 12 and thereby of the rotor shaft 5 coupled via the ball race with plastic molded part 6.

The factor which is common to all the exemplary embodiments described above is that the support of the relevant rotor shaft is not undertaken by a bearing end plate in the outer area of the stator but by using a bearing block on an end face of the stator or by using an insulating end disk positioned on the end face of the stator. The radial support is also not provided in the outer area of the stator but either in the stator slots or on a surface of the insulating end disk. The invention makes it possible to manufacture very compact electrical machines with reduced use of materials compared to the prior art. The overall smooth running of the electrical machine is no longer dependent on the quality of the punched stator package.

The invention has been described above on the basis of an exemplary embodiment in which the stator features a stator core and a stator winding and the rotor features a rotor shaft and a rotor excited by a permanent magnet, as is preferably the case in a brushless, electronically-commutated small electric motor. The invention however is also applicable in principle to all other types of electric motor which feature a stator module, for example with a laminated core, and a rotor module. The motor involved can be a synchronous motor, an asynchronous motor, a brush-equipped motor etc.

What is claimed is:

1. An electrical machine comprising:
    an outer stator,
    a top insulating disk positioned on one end face of the stator having an inner opening with an inner wall extending in an axial direction, an inner rotor comprising a rotor shaft, and a first bearing for the inner rotor, wherein the first bearing is supported on a first bearing block which in its turn is supported axially on an end face of the outer stator and radially by said inner wall of said first insulating disk, wherein the first bearing block comprises retaining fingers which extend in axial direction to reach in a slot in the outer stator, wherein the length of a finger is substantially less than an axial length of a slot, respectively;

a second bearing for the inner rotor, a bottom insulating disk positioned on the other end face of the stator;

wherein an inner wall of the second insulating disk is provided with a latching hook which effects an axial fixing of a second bearing block, and wherein the outer side of the second bearing block facing away from the bearing is supported radially on an inner wall of the second insulating end disk.

2. An electrical machine according to claim 1, wherein the bearing is positioned in a step of the bearing block and is supported there both in the axial and also in the radial direction.

3. An electrical machine according to claim 1, wherein the bearing block and the insulating end disk form a one-piece plastic molded part.

4. An electrical machine according to claim 1, wherein the bearing is a ball race, the outer ring of the ball race is supported in the bearing block and a spring washer is provided in the axial direction between the ball race and the bearing block.

5. An electrical machine according to claim 1, wherein the bearing is a cup bearing and the cup is pressed into the bearing block by means of a spring clip.

6. An electrical machine according to claim 5, wherein the cup bearing is injection-molded into the bearing block.

7. An electrical machine comprising:

an outer stator, an inner rotor comprising a rotor shaft, and a bearing for the rotor, wherein the bearing is supported on a bearing block which in turn is supported axially on an end face of the outer stator, the bearing is positioned in a step of the bearing block and is supported there both in the axial and also in the radial direction the outer side of the bearing block facing away from the bearing is supported radially on an inner wall of an insulating end disk, the inner wall of the insulating end disk is provided with latching hooks which effect an additional axial fixing of the bearing block, the bearing block comprises retaining fingers which engage in a slot in the outer stator, wherein the length of a finger is substantially less than an axial length of a slot, respectively, the bearing block and the insulating end disk form a one-piece plastic molded part, and the bearing is a ball race, the outer ring of the ball race is supported in the bearing block and a spring washer is provided in the axial direction between the ball race and the bearing block.

* * * * *